Aug. 17, 1926.
G. D. HENSON
1,596,432
ELECTRIC SOLDERING IRON
Filed March 18, 1925
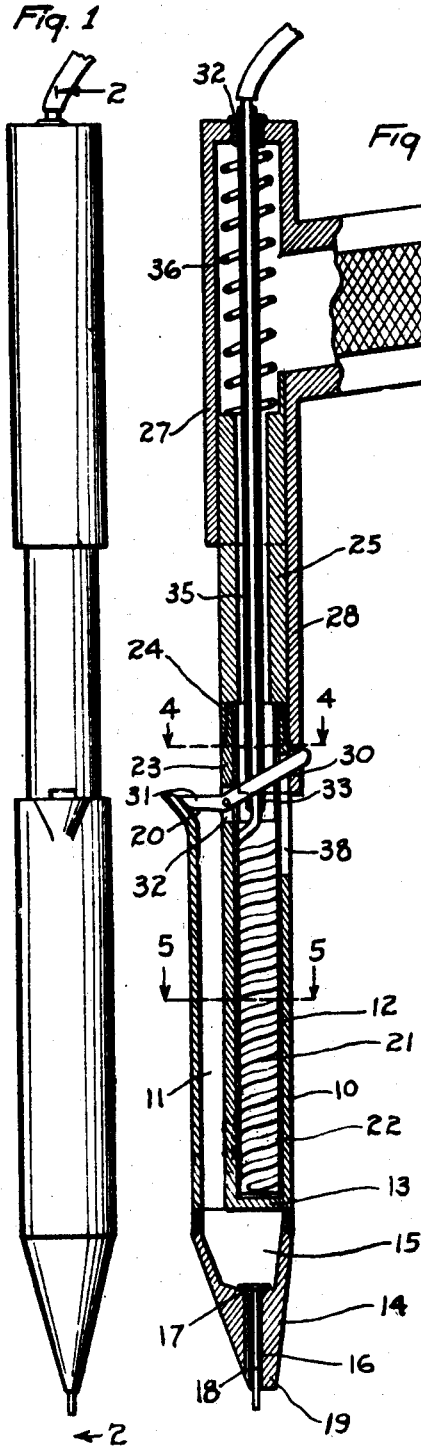
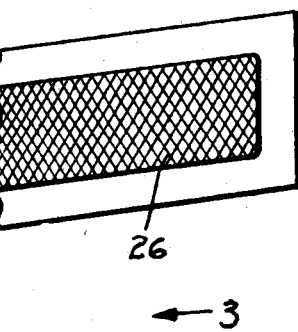
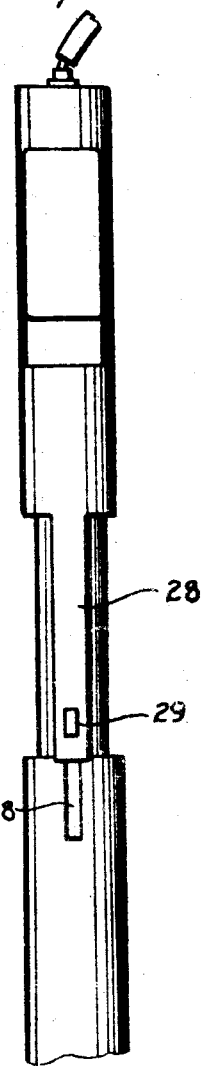
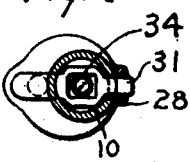
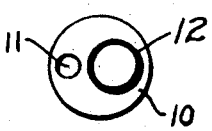
Inventor
George D. Henson.
by Hazard and Miller
Attys.

Patented Aug. 17, 1926.

1,596,432

UNITED STATES PATENT OFFICE.

GEORGE D. HENSON, OF LOS ANGELES, CALIFORNIA.

ELECTRIC SOLDERING IRON.

Application filed March 18, 1925. Serial No. 16,347.

This invention relates to improvements in soldering irons.

It is an object of the invention to provide an improved soldering iron having a chamber therein adapted to receive solder or similar materials to be melted, and to provide a heating element for heating the chamber so as to melt the solder within the soldering iron so that it may be readily applied to the work to be soldered.

A further object of the invention is to provide an improved soldering iron having a chamber which is electrically heated so that solder may be melted within the soldering iron, and to provide a valve controlled structure for controlling the discharge of the melted solder in the soldering iron upon the work, the valve being so constructed that the solder will not be discharged unless the soldering iron contacts with the work to be soldered.

A still further object of the invention is to provide a soldering iron having an electrically heated chamber adapted to receive solder to be melted, and to provide a device for keeping the entrance to the chamber receiving the solder closed under normal circumstances.

With the foregoing and other objects in view which will be made manifest in the following detailed description and pointed out in the appended claims, reference is had to the accompanying drawings for an illustrative embodiment of the invention, wherein:

Figure 1 is a side elevation of one side of the soldering iron;

Fig. 2 is a section taken substantially on the line 2—2 of Fig. 1;

Fig. 3 is a view in elevation showing the reverse side of the soldering iron from that shown in Fig. 1, and may be considered as taken in the direction of the arrow 3 upon Fig. 2;

Fig. 4 is a horizontal section taken substantially on the line 4—4 of Fig. 2; and Fig. 5 is a horizontal section taken substantially on the line 5—5 of Fig. 2.

Referring to the accompanying drawings wherein similar reference characters designate similar parts throughout, the improved soldering iron consists of a cylindrical body 10, which has a bore 11 extending therethrough and a second bore 12 formed therein. The bore 12 does not extend completely through the body 10, but provides a partition or closure 13 adjacent its bottom. Upon the lower end of the body 10 there is threaded a tapered or pointed closure member 14 having a recess 15 formed in its top providing a reservoir for melted solder, and the pointed closure 14 is also provided with a passage 16 extending longitudinally therethrough, which passage terminates adjacent the point of the pointed closure 14.

A valve 17 controls the flow of liquid from the reservoir 15 through the passage 16 and normally this valve is closed. The valve 17 has a stem or needle 18 extending downwardly within the passage 16 and projecting beyond the point of the closure 14. The needle 18 has a considerable clearance between its exterior surface and the interior surface of the passage 16 so that solder can readily pass downwardly through the passage 16 when the valve 17 is lifted. The valve 17 will be lifted when the soldering iron is brought in contact with the work to be soldered, it being understood that the needle 18 engages the work and is forced upwardly within the passage 16, lifting the valve. A suitable fin or similar projection 19 is formed upon one side of the closure 14 for manipulating the solder after it has been discharged upon the work. The solder to be melted is preferably in the form of wire solder and can readily be inserted into the bore 11, constituting a solder chamber, through its entrance 20.

The bore or chamber 12 is adapted to receive an electric heating element 21, which may be in the form of a suitable wire coil about a core of insulating material. A sleeve of insulating material 22 is arranged about the heating element 21 within the chamber 20 so as to prevent contact between the wire upon the coil and the metallic body 10. This sleeve or container is preferably formed of mica or the like, which will preserve its insulating qualities even though heated.

The material of the body 10 about the chamber 12 extends upwardly, as at 23, and is threaded, as at 24, to receive a nipple or sleeve 25. A handle 26, which is preferably hollow, is provided with a sleeve portion 27 which is slidable upon the nipple or sleeve 25. The sleeve portion 27 is provided with a finger 28 which extends downwardly over the sleeve 25 to a point adjacent the top of the solder chamber 11. The finger 28 has an aperture 29 formed therein adapted to receive the end of the arm 30 of a closure 31, constituting an entrance closure for the solder chamber 11. The part of the body separating the chambers 11 and 12 has an aperture 32 formed therein through which the closure 31 extends, and the closure 31 is pivoted upon a pin 33. Within the chamber 12, the arm 30 is in the form of a yoke 34, as clearly shown in Fig. 4. A tube 35 extends downwardly within the sleeve portion 27 of the handle 26 through the yoke 34 and into the chamber 12 to a point slightly above the upper end of the heating element 21. The wires which supply electric current to the heating element 21 are disposed within the tube 35, it being understood that the tube provides a protection for the wires within the soldering iron. A coil spring 36 is disposed within the sleeve portion 27 of the handle 26 and the upper end of the sleeve 25 provides one spring seat for the spring. The upper end of the sleeve portion 27 which has an aperture 37 therein, which slidably receives the upper end of the tube 35, provides the other spring seat for the coil spring 36. The coil spring 36 normally urges the handle 26 away from the body 10, and the finger 28 in such position swings the closure 31 into closed position to keep the entrance to the solder chamber 11 closed. When it is desired to fill the solder chamber, the fin 19 may be rested upon any suitable surface and the handle 26 may be caused to slide downwardly upon the nipple or sleeve 25, causing the finger 28 to swing the end of the arm 30 downwardly through an elongated aperture 38 formed in the body 10, and thus swing the closure 31 into open position. When the handle is forced downwardly upon the body against the action of the spring 36, forcing the closure open, solder may be inserted into the solder chamber 11. As the solder chamber 11 is preferably cylindrical, it will be understood that the wire solder is especially adapted to be inserted into the chamber. The heating element 21 heats the body, the solder chamber 11 and the solder, which may be inserted therein, and the heat of the heating element is sufficient to melt the solder so that it runs downwardly into the reservoir 15.

In soldering, the soldering iron is caused to contact with the work so that the needle 18 lifts the valve 17, permitting the solder to flow onto the work through the passage 16. After a sufficient amount of solder has been discharged from the soldering iron onto the work, it can be readily manipulated by the fin 19. The spring 36 is of such strength that the handle 26 will not slide downwardly upon the body when the needle 18 contacts with the work, and the handle will only slide downwardly when a considerable force is applied to it, forcing it toward the body 10. In this manner the entrance to the solder chamber 11 is normally kept closed. The upward movement of the handle 26 is limited because of the arm 30. By having the spring 36 remotely situated with respect to the closure 30, the heating of the chamber 11 by the heating element 21 will not tend to draw the temper of the spring. If desired, the wires, which are within the tube 35, may be connected to a suitable switch mounted upon the handle 26 so that the heating of the heating element 21 can readily be controlled from the handle.

From the above it will be appreciated that an improved electrically heated soldering iron is provided, which has a chamber within the soldering iron adapted to receive solder or similar material to be melted; that a closure is provided for the lower end of the chamber with valve means for controlling the flow of melted solder from the chamber onto the work; that an entrance closure is provided for the solder chamber for normally keeping the entrance closed so that the soldering iron can be laid upon a bench without danger of the solder running out of the entrance; and that spring means which is remotely located from the entrance closure is provided, which normally keeps the entrance closure closed.

Although the soldering iron has been described in connection with solder, it is to be understood that such reference to solder is for illustrative purposes only, and that other materials, such as lead and the like can be equally well employed, and that the term solder within the appended claims is intended to include all such materials which are the equivalent of solder.

It will be understood that various changes in the detail of construction may be made without departing from the spirit or scope of the invention as defined by the appended claims.

I claim:

1. A soldering iron having a chamber formed therein adapted to receive solder to be melted, a tapered closure for one end of the chamber having a passage for conveying melted solder from the chamber, and a valve having a needle extending downwardly through said passage and projecting therebeyond, whereby contact between said needle and the work to be soldered may open said valve so as to permit solder to flow from said chamber through said passage.

2. A soldering iron comprising a body having two chambers formed therein, an electric heating element disposed within one of said chambers, the other chamber being adapted to receive solder to be melted, a pointed closure for the body having a passage formed therein through which melted solder may flow, a valve for controlling the flow through the closure, an entrance closure for the entrance to the chamber, and spring means for keeping the entrance closure closed.

3. A soldering iron comprising a body having two chambers formed therein, an electric heating element disposed in one of said chambers, the other chamber being adapted to receive solder to be melted, a handle slidable upon the body, spring means for urging said handle away from the body, a closure for the entrance of the solder receiving chamber pivoted upon the body and operatively connected to said handle, whereby when the handle is caused to move upon the body against the action of said spring, the closure may be opened, and means for discharging melted solder from the solder chamber.

4. A soldering iron comprising a body having two chambers formed therein, an electric heating element disposed in one of said chambers, the other chamber being adapted to receive solder to be melted, a handle slidable upon the body, spring means for urging said handle away from the body, a closure for the entrance of the solder receiving chamber pivoted upon the body and operatively connected to said handle, whereby when the handle is caused to move upon the body against the action of said spring, the closure may be opened, and means for discharging melted solder from the solder chamber upon contact with the work to be soldered.

In testimony whereof I have signed my name to this specification.

GEORGE D. HENSON.